(No Model.)
W. H. DODGE.
BAND SAW MILL.
No. 353,669. Patented Dec. 7, 1886.
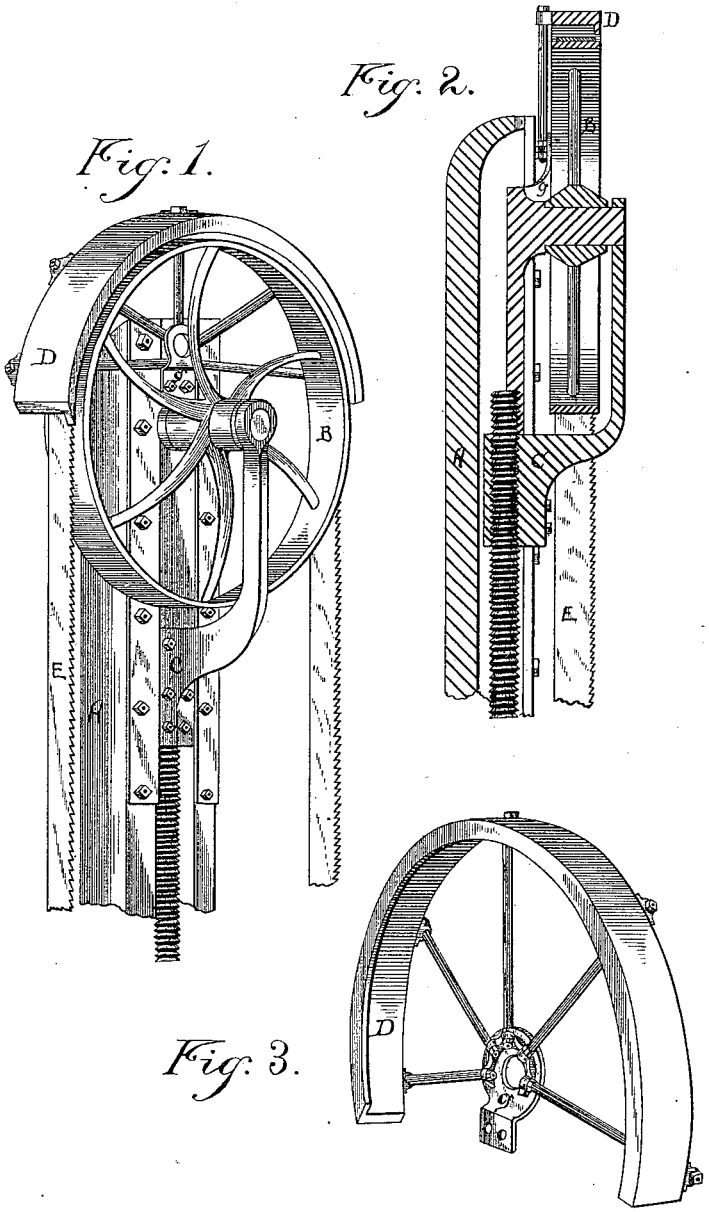
WITNESSES:
J. B. McGinn
W. H. Cooper
INVENTOR.
Wallace H. Dodge
By his atty
R. D. O. Smith

UNITED STATES PATENT OFFICE.

WALLACE H. DODGE, OF MISHAWAKA, INDIANA.

BAND-SAW MILL.

SPECIFICATION forming part of Letters Patent No. 353,669, dated December 7, 1886.

Application filed April 1, 1886. Serial No. 197,438. (No model.)

*To all whom it may concern:*

Be it known that I, WALLACE H. DODGE, of Mishawaka, in the county of St. Joseph and State of Indiana, have invented a new and useful Improvement in Band-Saw Machines; and I do hereby declare that the following is an accurate description of the same.

Band-saws are liable to accident while running, and breakage is not uncommon. When it is considered that lumber-cutting band-saws are from forty to fifty feet in length, and when new about six inches in width, and are moved with speed varying from eight thousand to twelve thousand feet per minute, the effect of its sudden release from restraint when the saw breaks can be easily imagined. The saw is frequently buckled and broken in other places. Adjacent objects and the lives of workmen are frequently endangered.

Heretofore, so far as I am aware, no provision has been made to guard against the disastrous effects liable to ensue when the band-saw breaks, though I am aware that the frame or pillar of a band-saw machine has been made with an arched top extending above and covering the saw; but in that case it was not concentric with the upper band-pulley, nor parallel with the face of said pulley, and could not serve to arrest the saw without liability to mutilate the saw in arresting it.

The object of my invention is to provide such a safeguard; and it consists in a shield placed above the upper band-wheel and concentric thereto, and parallel with the face of said wheel, to control the broken saw and prevent it from flying wildly off. The resulting friction against said shield takes up the momentum of the saw and quickly brings it to a standstill.

In the accompanying drawings, Figure 1 is a side elevation of a band-saw machine having my shield attached. Fig. 2 is an end elevation showing my shield in section. Fig. 3 is a perspective view of my shield detached.

A is the post which supports the upper band-wheel, B. Its front side is provided with a guide for the sliding bracket C, which carries the center shaft of said wheel B, so that said wheel may be moved up or down at will to accommodate the band-wheels to saws of different lengths, or to adjust the tension of the saw.

D is my saw catcher or shield. It is preferably made of wood, and most conveniently by bending a suitable board or plank in the arc of a circle having a radius three or four inches greater than the radius of the wheel B, so that when properly mounted there will be between said shield and the upper half of the wheel B a concentric space of three or four inches, through which the saw E runs. The shield D is supported by arms, the inner ends whereof are attached to a center plate, *g*, which is bolted to the sliding bracket C, so that as the wheel B is moved up or down with its sliding bracket the shield D will be correspondingly moved, and its position with relation to the band wheel will be maintained unchanged.

If not convenient to carry the shield on the sliding bracket C, it may be provided with an independent slide, arranged so that it may be automatically raised when the band-wheel is raised, and free to descend by gravity when said wheel descends; or it may be arranged to be separately adjusted; but it is altogether preferable to attach it to the bracket C, so that without further care it will be always adjusted with the band-wheel. By these means when the saw breaks it is immediately thrown up against the shield, and its momentum is quickly absorbed in friction against the shield, and until its forward movement has been entirely arrested it will be controlled and the saw compelled to move forward substantially in the plane of the band-wheel without serious danger of damage to itself or surrounding objects.

Having described my invention, I claim—

1. In combination, in a band-saw machine, an upper band-wheel, B, to support and carry the saw, and above said wheel a flat shield or catcher concentric to and parallel with the face of said wheel and with a small intervening space, as set forth, whereby, if the saw breaks, it will be immediately arrested, as set forth.

2. In a band-saw machine, the band-wheel B, sliding bracket C, whereon the center shaft of said wheel is supported, so as to be adjusted when desired, combined with the concentric shield or catcher D, mounted upon said sliding bracket, substantially as and for the purpose set forth.

WALLACE H. DODGE.

Witnesses:
ED. A. JERNEGAN,
R. D. O. SMITH.